A. R. McCAUSLAND.
SPEED REVERSING MECHANISM.
APPLICATION FILED MAR. 8, 1909.
1,007,957.
Patented Nov. 7, 1911.
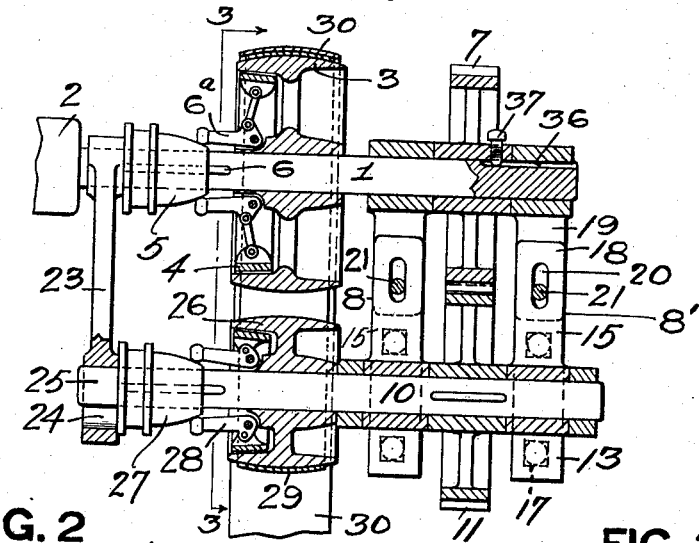
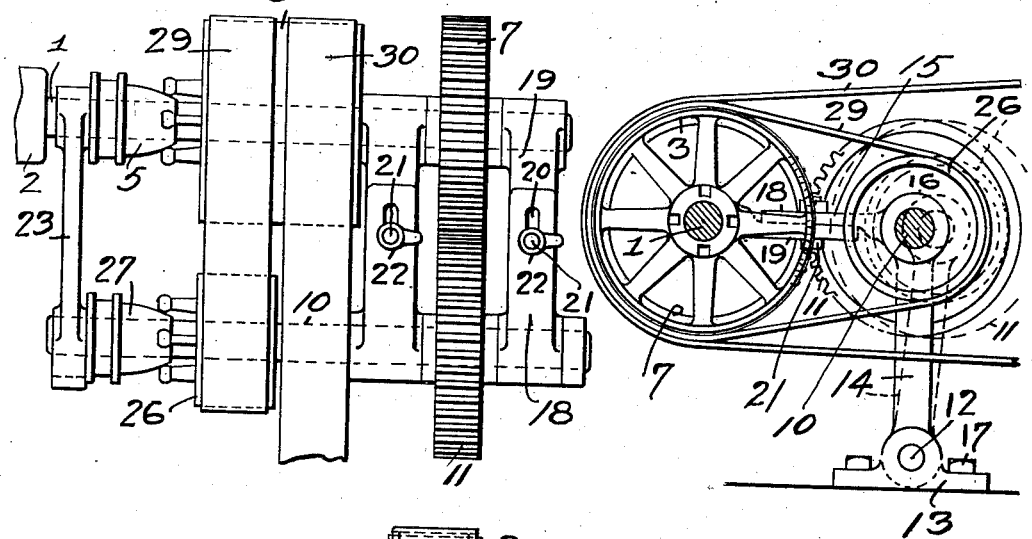
WITNESSES.
J. R. Keller
Robert C. Totten
INVENTOR.
Arthur R. McCausland
By Kay L. Totten
Attorneys

UNITED STATES PATENT OFFICE.

ARTHUR R. McCAUSLAND, OF WASHINGTON, PENNSYLVANIA, ASSIGNOR OF ONE-HALF TO BLANCHER D. NORTHRUP, OF WASHINGTON, PENNSYLVANIA.

SPEED-REVERSING MECHANISM.

1,007,957.  Specification of Letters Patent.  Patented Nov. 7, 1911.

Application filed March 8, 1909. Serial No. 482,079.

*To all whom it may concern:*

Be it known that I, ARTHUR R. McCAUSLAND, a resident of Washington, in the county of Washington and State of Pennsylvania, have invented a new and useful Improvement in Speed - Reversing Mechanism; and I do hereby declare the following to be a full, clear, and exact description thereof.

My invention relates to speed changing mechanism, and more especially to speed reversing mechanism for use with oil well machinery and the like. Its object is to provide a simple mechanism which, when used, for instance, with a gas engine, will readily reverse the driven members, which can be compactly constructed, and which can be conveniently disconnected when not required.

A further object is to provide efficient means for adjusting the said mechanism and maintaining it in working condition.

To these ends my invention consists in the arrangement and combination of driving shaft, countershaft, gearing and clutches thereon as hereinafter more particularly described and claimed.

It also consists in adjustable means for moving the countershaft relative to the driving shaft and thereby tightening the driving connection between them.

In the drawings Figure 1 is a horizontal section showing my invention; Fig. 2 is a plan view showing an alternative construction; Fig. 3 is an end view partially in section of the construction shown in Fig. 2; and Fig. 4 is a detail plan view of another embodiment.

The driving shaft 1 is shown as a stub shaft connected to the fly wheel or source of power, as indicated at 2. Rotatable on this shaft is the pulley wheel 3, and connecting this pulley wheel to the shaft is shown the friction clutch 4, which can be conveniently constructed of the type shown, having the spool member 5 slidable in a slot 6 in the driving shaft, and having internal expansion gripping members, indicated at 6ª mounted within the pulley. The driving shaft also has keyed thereto a gear wheel 7.

Journaled within the pivot-brackets 8 and 8' is the counter-shaft 10. The counter-shaft 10 carries the gear wheel 11 keyed thereto and adapted to intermesh with the gear wheel 7 on the shaft 1. The pivot-brackets 8 and 8' are of general elbow shape and have the pivots 12 connecting them to the fixed supports 13, the vertical arms 14 and the horizontal arms 15 pivoted to each other, as at 16, shown clearly in Fig. 3, the said pivot-brackets being identical in construction. The fixed supports 13 are shown preferably held to the floor ground by the bolts 17.

The horizontal arms 15 are composed of two parts, indicated by the reference numerals 18 and 19, which are slidable on each other and have the slots 20 extending through both arms, shown in register. Through these slots are placed the bolts 21 having the nuts 22. The driving shaft 1 and countershaft 10 are also connected by the connecting link 23 which is journaled on the driving shaft by an ordinary journal, and has the elongated axle eye 24 in which the nib 25 of the counter-shaft 10 is journaled. The counter-shaft 10 carries also the pulley wheel 26 and the clutch 27, 28, adapted to connect said pulley wheel to said counter-shaft 10 and preferably similar in construction to the clutch 4, as shown in Figs. 1 and 2. The pulley wheels 3 and 26 are connected by the belt 29. The driving belt 30 on the pulley 3 is shown in Fig. 1 as mounted immediately upon the outside of the connecting belt 29. Fig. 2 illustrates an alternative construction, the pulley 3' having a broader face adapted to accommodate the connecting belt 29 and the driving belt 30 side by side, and the pulley 26 being set opposite to the part of the pulley 3' on which the connecting belt 29 is mounted. In this construction a sprocket and chain connection could obviously be substituted, if desired.

When it is desired to use the full speed ahead of the motor or engine the clutch 4 is set and the driven pulley is hence actuated directly from the driving shaft 1. This is usually the case in the class of machinery to which my invention is particularly adapted, although I do not limit its use to oil well or any other type of machinery, but claim for it all uses to which it is applicable. To reverse the driven pulley 3, and hence the driven machiney (not shown), the clutch 4 is disengaged and the clutch 27, 28 is set. The counter-shaft 10 is then actuated backwardly by the gear wheels 7 and 11; and the driven pulley 3 is driven backward by the pulley 26 and the connecting belt 29. The backward speed depends on the relative size of the gear wheels 7 and 11 and the pulley wheels 26 and 3, and any speed desired can be obtained by changing the sizes of any of these wheels without interfering with the remainder of the mechanism. At the full forward speed the countershaft 10 revolves backwardly but idly, being driven by the gear wheels 7 and 11; and in the construction shown in Figs. 1 and 2 the pulley wheel 26 will at the same time revolve forward, actuated by the connecting belt 29.

When, for any reason, the reversing mechanism is not needed for a period of time, the pivot-brackets 8 and 8' may be used to disconnect the mechanism. The nuts 22 are loosened on the bolts 21 and the two members 18 and 19 are slid along each other, thus disengaging the gear wheels 7 and 11, the pivot-brackets at the same time turning at the pivot 12 and at 16 about the countershaft 10. It is necessary first to slip off the connecting belt 29 from the pulleys 3 and 26 before moving the pivot-brackets, the counter-shaft 10 then sliding in the elongated axle eye 24 of the connecting link 23. By this means I provide a speed changing mechanism which can be entirely disconnected when not needed, thereby doing away with all wear of parts revolving in the same or opposite directions.

The gear wheel 7 is keyed in the elongated key-way 36 in the shaft 1, extending to the end of said shaft. The gear wheel 7 is held in position thereon by the set screw 37, which may be loosened when desired, and the gear-wheel 7 withdrawn from mesh with the gear-wheel 11, so that the connecting belt 26 can be tightened if it has worked loose or stretched.

In Fig. 4 I have illustrated an alternative construction having the clutch 32, on the driving shaft 1 connecting said driving shaft to the gear wheel 33, which is loosely rotatable thereon. The pulley wheel 34 is keyed to the counter-shaft 35. The other parts are identical in structure and mode of operation with the constructions described above. In this embodiment the full speed ahead is obtained in exactly the same way by setting the clutch 31, as shown in Fig. 4. The counter-shaft 35 is here rotated forwardly during forward motion by the connecting belt, the pulley wheel 34 being keyed to the counter-shaft. The backward speed is secured by loosening the clutch 31 and setting the clutch 32. This drives the driven pulley back by the gear wheels 33 and 11, the counter-shaft 35 and the pulley 34 and connecting belt 29.

In both the embodiments of Figs. 1 and 4 the two clutches may be conveniently operated from one lever device, as well understood in the art. The whole mechanism is simple and can be compactly set up, which is of great advantage in machinery of this type.

What I claim is:

1. In speed changing mechanism, the combination of a driving shaft, a driven wheel rotatable thereon, and a clutch adapted to fix said wheel thereto, with a countershaft, adjustable means for supporting said countershaft in fixed position relative to said driving shaft, a wheel thereon, a connection between said wheel and said driven wheel, another wheel on said driving shaft, and another wheel on said countershaft operatively connected thereto, two of said last mentioned wheels being fixed to their respective shafts, and a clutch adapted to fix the third of said wheels to its shaft.

2. In speed changing mechanism, a driving shaft, a driven pulley rotatable thereon, a clutch thereon adapted to engage said pulley, and a gear wheel on said driving shaft, in combination with a counter-shaft, a gear wheel thereon in engagement with the aforesaid gear wheel, a pulley rotatable on said counter-shaft, and a clutch thereon adapted to engage said pulley, a belt connecting said pulley with the aforesaid driven pulley, and a driving belt on said driven pulley.

3. In speed changing mechanism, a driving shaft suitably supported, a countershaft, and driving connections between said shafts, a bearing for said driving shaft, and a movable bearing support for said countershaft comprising a fixed support, a vertically extending arm pivoted thereto and carrying the countershaft, and a horizontally extending arm pivotally connected to said vertically extending arm and provided with means for attaching it in fixed adjusted position to said driving shaft bearing.

4. In speed changing mechanism, the combination of a driving shaft provided with a fixed bearing and an arm extending therefrom, of a countershaft, driving connections between said shafts, and an adjustable bearing support for said countershaft comprising a pivotally mounted supporting arm having a countershaft bearing and a connecting arm arranged to engage with aforesaid arm of said driving shaft bearing and provided with a bolt and slot connection therewith to hold the countershaft in adjusted position, substantially as described.

5. In speed changing mechanism a driving shaft, a driven wheel rotatable thereon, a clutch adapted to fix said wheel to said shaft, and a gear wheel on said shaft, in combination with a countershaft, a gear wheel thereon in mesh with aforesaid gear wheel, another wheel rotatable thereon, a clutch adapted to fix said wheel to said countershaft and a belt connecting said wheel to said driven wheel.

In testimony whereof, I the said ARTHUR R. McCAUSLAND have hereunto set my hand.

ARTHUR R. McCAUSLAND.

Witnesses:
L. C. SONDA,
LAURA E. GATFIELD.

Copies of this patent may be obtained for five cents each, by addressing the "Commissioner of Patents, Washington, D. C."